Dec. 4, 1945.  A. LE R. BOLTON  2,390,351
PROCESS FOR MAKING JORDAN ENGINE LININGS
Original Filed July 3, 1940  2 Sheets-Sheet 1

INVENTOR.
Archer LeRoy Bolton
BY Gardner D. Pearson attorney

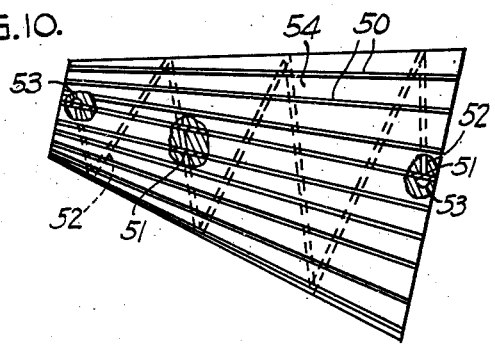
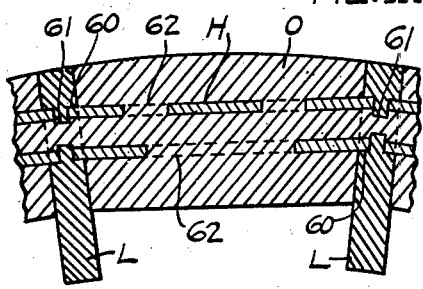
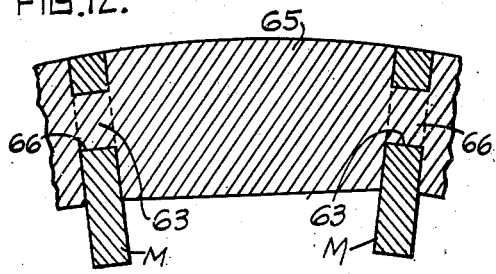
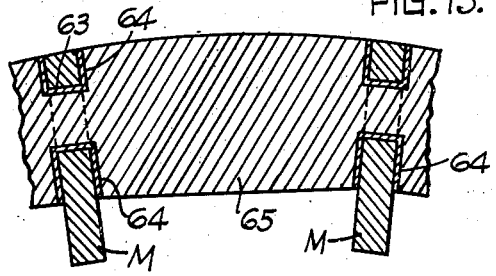
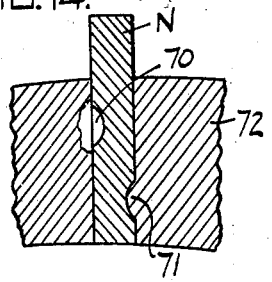
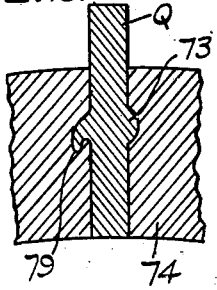
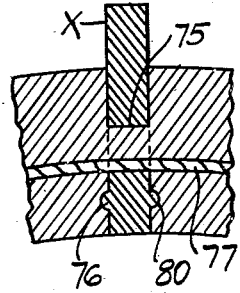

Patented Dec. 4, 1945

2,390,351

UNITED STATES PATENT OFFICE 2,390,351

PROCESS FOR MAKING JORDAN ENGINE LININGS

Archer Le Roy Bolton, North Andover, Mass.; Archer L. Bolton, Jr., executor of said Archer Le Roy Bolton, deceased, assignor to John W. Bolton & Sons, Inc., a corporation of Massachusetts Original application July 3, 1940, Serial No. 343,832. Divided and this application July 28, 1941, Serial No. 404,311

1 Claim. (Cl. 18—59)

This invention is a division of application for United States Letters Patent on Jordan engine lining and process of making, filed July 3, 1940, Serial No. 343,832, and relates to Jordan engines and particularly to liners for Jordan engine shells and Jordan engine plugs. Plugs and shells are both of truncated conical form and the inside curved surface of the shell and the outside curved surface of the plug are equipped with knives which may be bent or straight and the spaces between them are ordinarily partly filled with what are known as separators. These separators have generally been made of wood cut to fit, but separators of metal have been tried and in some cases knives and separators have been merged together in a single casting as in the patent to Bahr No. 946,752, January 18, 1910.

This invention has particular reference to preconstructed bodily transportable liners for the inside of a shell, or the outside of a plug and its principal purpose is to substitute for the preformed, precut separators a material which, when in the plastic or workable form, can be put between the knives or bars and which will then harden so as to fill the desired space along the length of the knives and the desired distance up from the base towards the working edges.

In a construction where preformed separators are used, they must be cut very accurately or be made of a material which has more or less elasticity so that they can be squeezed and forced into position and preferably also of a material which will swell when in contact with water so that there will be a drumtight fit between the knives and the separators.

In case of the shell lining, the tendency to expand helps to hold it in place, but on the outside of a plug which revolves at a very high rate of speed, there is a strong tendency for the bars and separators to be thrown out by centrifugal force. This tendency with all-metal cast jackets or liners for plugs is readily overcome, but with a separator built up of different parts and particularly of different materials, the bars and separators must be firmly locked in place so that they will not loosen or fly out.

Partly on account of this tendency, the liners or jackets of Jordan plugs are still, in the majority of cases, built up on the plug itself by separate knives, known as bars, and separate separators, each of which is slotted, the knives being provided with tongues which go under bands fixed to the plug itself. In other cases, the bars go into slots which spread out at the bottom while the bars themselves are larger at the outside so that the bars are locked to the plug and the separators are locked between the bars.

In the patent to Gloyd, No. 1,963,787 of June 19, 1934, is shown a lining for plugs or shells made up of curved or wavy strips of metal so welded together as to form cells which are filled with cement. This construction of cells, however, is not as satisfactory as the more common construction of straight bars or bent knives with some sort of separators between them, the separators being of less depth than the knives or bars.

This Gloyd patent and No. 1,947,644 cover rigid metal structures in which cement is merely used to fill cells, these cells being formed by metal connecting means between the knives, while my structure without the filling material unless it is in a form, is not usually rigid. My finished structure has nothing which might be called cells.

In the patent to Gloyd, No. 1,947,644 of February 20, 1934, he shows a shell lining in which flat strips are welded part way up between the bases and the working edges between the knives to form a shell lining, the space at the outside between the strips and the bases being filled with cement, but he finds it necessary to anchor this cement in place by punching holes in the knives to prevent the cement from falling out.

The purpose of this invention is to make a Jordan lining for the inside of a shell or the outside of a plug in which substantially the regular type of metal knives or bars are used, but the space between is filled with a plastic or pourable material which has hardened and which when and after hardening fills completely the designated or desired space between the knives or bars without leaving any crack or recess into which the stock can lodge to rust or to weaken the construction.

Its purpose is to avoid the careful and expensive forming and fitting of preformed separators so that there will be no cracks nor crevices in them nor between them and the adjoining knives or bars.

In the case of a shell lining or a plug jacket, I have found that some permanent re-inforcing, as annular wires, bands, hoops or spiral cables are desirable to hold the structure together against centrifugal forces or some unusual or extraordinary, destructive force.

I believe I am the first to discover that such a preassembled lining can be made by what might be called re-inforcing molding process which will produce a re-inforced molded structure in which separate preformed knives of metal or some other hard material are connected by a hardened material which is so molded when soft as to conform exactly to the adjoining surfaces of the knives. Preferably the knives are also connected by a metal or other suitable material different from and stronger in many respects than the hardened material, these connecting members being buried in the molded material.

Preferably I use knives or bars through which are holes for the passage of metal wires, these knives or bars being held in place in some suitable way in the nature of a mold while a relatively soft material which will flow or can be pressed into place such as phenol-formaldehyde, synthetic resin, plastic wood, cement or other material is flowed or forced into place between the knives and surrounding the wire.

Some of these plastics can be used as a liquid when cold and will harden when their volatile part evaporates and some can be poured when melted and in some there may be a chemical change.

In some cases, the material can be poured into place and in other cases, it can be put in position by a trowel, a power gun or other similar device.

For a shell lining which goes inside of a Jordan shell, the construction need not be as strong as for a plug jacket which goes outside of a Jordan plug. For shell linings, in many cases and for plug jackets in some cases and with a suitable moldable material, the re-inforcing wires or other similar re-inforcing means can either be omitted entirely or can be replaced by metal spacers or separators which do not hold the knives together but keep them apart while the structure is being molded and limit the compressibility of the structure as a whole.

In some cases, the holding quality of the moldable material, produced by its accurate fit to part of the surface of the knives, can be increased by a layer of adhesive between it and each adjoining knife.

A plug jacket must be held more firmly together not only to resist the centrifugal force created by the revolving plug but also to resist any tendency of the moldable material to swell when wet and thus to increase its circumference.

Such swelling is an advantage in a shell lining, but in any case, the unitary structure must be such that it will hold together during transportation and installation and so that if any crevices or cracks or openings appear in any place, they will either be filled by the expansion of the material after being soaked or will be in places where they do no harm.

Separators made of wood are extensively used but it is difficult to get uniformity in their structure and wearing qualities. The assembly is only as strong as the weakest part and by using a moldable material of uniform consistency, I secure a material which will be uniform in strength and which can be flowed or trowelled into place with equal pressure when in a soft condition and which, when it hardens, will wear down at about the same rate as the knives and thus avoid the expensive chipping process.

The preferred material for molding is one which, when it hardens, will not shrink sufficiently to permit cracks or spaces in the structure through which water can get behind the lining or one which, if it does shrink slightly, will swell when soaked in water.

I claim in this application a mold or assembly of parts for use with the process and the process of making not only the finished lining but the unfinished structure in the process of molding, in which some or all of the spaces are filled with the material in a soft condition or in which some spaces are empty, some are filled with the soft material and some are filled with the hardened material.

A preferred material for molding is one which can be flowed or trowelled in a soft condition and which, after it has hardened, will, when soaked in water, swell a certain amount in the shell lining and a less amount in a plug jacket and one which will wear down at about the same rate as the knives, to avoid the expensive chipping process.

I have found that certain cellulose acetate combinations which will flow at about 275° F. such as are known commercially as Tennite or Nonsanto are suitable but I can use certain blood derivatives, asphalt, waterproof Portland cement or even some kinds of metal for my moldable material.

In the drawings,

Fig. 10 is a diagrammatic side elevation partly in section of a Jordan lining wherein the knives are connected by a spirally wound wire.

Figs. 11, 12 and 13 are views similar to Fig. 8 of modifications of my invention as applied to a shell lining.

Figs. 14 and 15 and 16 are detail sectional views illustrating other modifications of my construction.

The vital difference between forming a self-supporting movable lining for a Jordan shell or a jacket for a plug with pre-formed, rigid separators and forming one with a plastic in a soft and moldable or fluid condition is that preformed separators not only fill the space between the bars and knives but also determine the space between them, while with a moldable separating material not only must the bars or separators be properly spaced and held together but the moldable material must be confined on at least three sides and usually on five sides or even on six sides, one side having a filling mouth.

Consequently, I will describe and show a complete lining or jacket as it appears in the false work which is probably necessary for making a jacket or a lining but which is removed, or from which the finished article is removed, after the moldable plastic has become hard.

Figure 1:
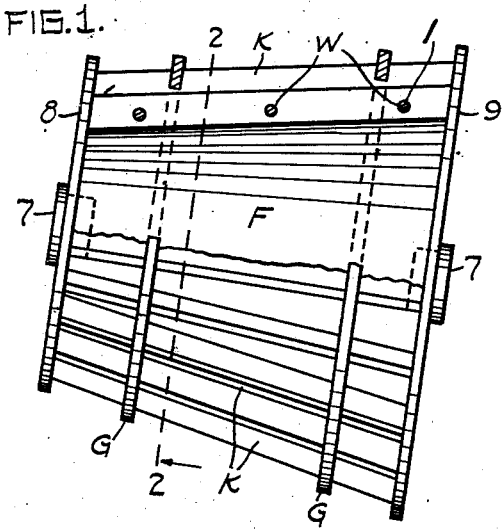
Fig. 1 is an elevation of a form or mold with a plug jacket in it with parts broken away to show the construction.
Figure 2:
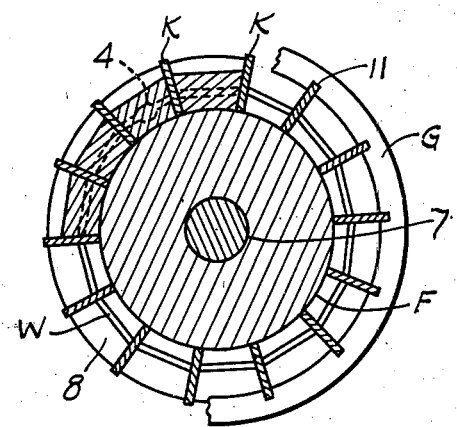
Fig. 2 is a section as from the right of line 2—2 of Fig. 1, viewed from the direction of the arrow, of a plug jacket being made in a form with four sections of molded material in place and the rest with straight knives held in position in guides and with endless metal wires between the knives.

In the drawings, Fig. 1 shows an arrangement by which certain moldable materials can be put in place by means of a trowel or similar implement.

Throughout the drawings F represents an inside form which corresponds in size with the plug for which a jacket is to be made.

Figure 3:
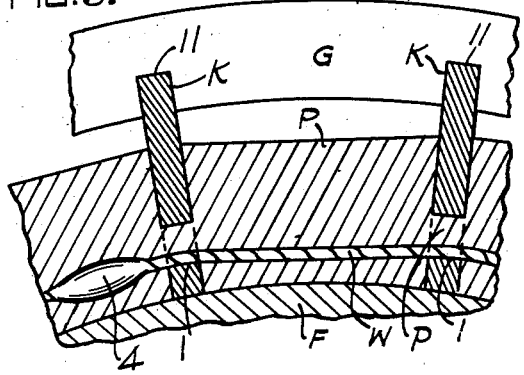
Fig. 3 is an enlarged fragmentary section of the parts shown in Figs. 1 and 2, the section being made on a plane which passes through one of the endless wires, the wire itself being shown in full lines and as a twisted cord.

Around this form F, the knives or bars K, K, are assembled in any convenient way and in any desired arrangement. Each knife K has a hole 1 through which is passed a wire W which is shown in Fig. 3 as a more or less flexible cable. The ends of each of these wire cables, such as W, are welded together as at 4, thus being endless. As shown, each wire W is much smaller than the hole 1 through which it passes. The important matter of spacing the knives K is shown as accomplished by gages G, G, each having a series of transverse slots such as 11 into which each knife K fits so closely and deeply that it is held in place between the gage G and form F.

As shown in Fig. 1, there is plenty of room between the gages G, G, so that a plastic can be pressed in between the knives K, K, being prevented from squeezing out the ends by disc forms 8 and 9, shown as fastened to form F by capscrews 7, 7.

By keeping the space between two adjoining knives K, K, substantially level or horizontal while filling and letting it stiffen or harden and then turning the assembly to the next space, all of these spaces can be filled. including the whole of the inside of each hole 1 so that the molded material extends between the knives and all around the liner.

Figure 4:
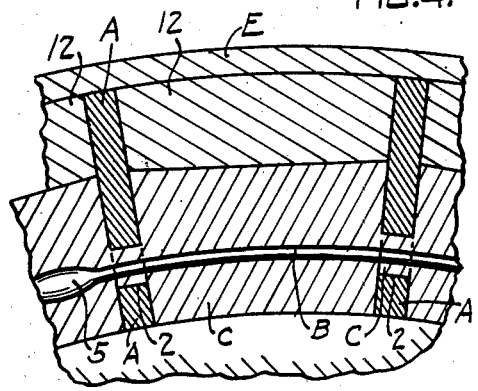
Fig. 4 is a view similar to Fig. 3 of a modified construction of part of a plug jacket with an endless wire or band which is not twisted.
Figure 5:
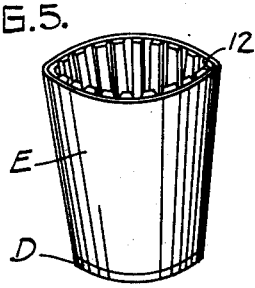
Fig. 5 is an isometric view of a form with an end disc such as is used in making the construction shown in Fig. 4.

A soft, flowable or fluid plastic might be used in the same way, but for plastics in a still more fluid condition and as another way of assembling, I can use the arrangement shown in Figs. 4 and 5.

In this case for a gage or gages, I use an outside truncated conical form E which may be smooth on the inside and has attached to the bottom, or which rests on, an end disc D. The knives with holes 2 are spaced apart by removable blocks such as 12 which hold them in position between forms E and F. The assembly is rested on the small end with the relatively stiff wires or hoops B, the ends of which are shown as welded together as at 5, passing through the holes 2, 2. These hoops do not press inward against the inside edge of each hole 2, as do the wires W against the inside of each hole 1 but may be in any position because the moldable material or plastic C is poured as a liquid in at the top of each space between the knives, blocks and forms at the large end of the assembly, the material being confined between the disc D, forms E and F, blocks 12 and to some extent between knives A, A.

Figure 6:
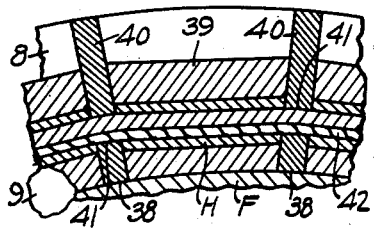
Fig. 6 is a sectional view, similar to Figs. 3 and 4, of another modified construction
Figure 7:
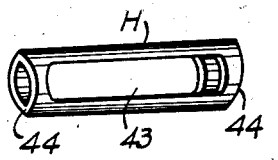
Fig. 7 is an isometric view of one of the spacers shown in Fig. 6.

As shown in Figs. 6 and 7, instead of using gages or spacers such as G, I may use spacers H which, as shown in Fig. 7, are substantially metal tubes with longitudinal slots or holes 43 and ends 44, 44 bevelled and smoothened so as to correctly space the knives 40, 40 which have holes 41 through which passes a wire 42. These with a form F hold the assembly together so that a moldable plastic 39 can be trowelled in between the knives, around spacers H so as to fill the holes 41 through the slots 43 and thus the entire space.

The moldable material in liquid form can be poured or flowed in to each space between adjoining knives 40, 40, and form F and end discs such as 8 and 9 if the bottom edges 38, 38 of the adjoining knives 40, 40 are kept horizontal until the material hardens.

Figure 8:
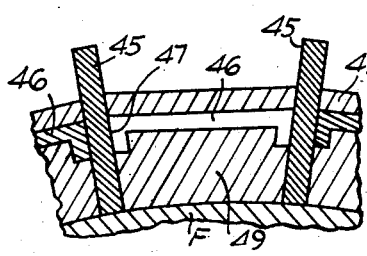
Fig. 8 is a view similar to Fig. 6 of another modification and Fig. 9 is an isometric view of the type of spacer shown in Fig. 8.
Figure 9:
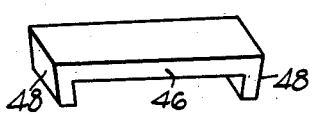

As shown in Fig. 8, I can use knives such as 45, 45, without holes and without wires, substituting for them the separating and uniting members 46, each of which as shown in Fig. 9, has ends 48, 48 of the correct shape and slant so that when each end is welded as at 47 to a knife 45, the members 46 hold the whole assembly of the knives in the correct position so that moldable material 49 can be trowelled in and entirely around each member 46 so that they, like the wires, are buried in the moldable material, both before and after it has hardened.

As shown in Fig. 10, by using a moldable plastic and false work or a suitable form, knives such as 50 with offset holes 51, 51 can be so arranged that when assembled the holes will form a spiral through which a single wire or a twisted wire cable 52 can be passed in a spiral form with its ends 53, 53 locked in place. 54 represents the plastic material which can be put in place between the knives to separate them and keep them in the desired position and at the right angle when it hardens and also to bury the wires.

A great advantage of the use of moldable plastics for a plug jacket is that in connection with a plug having a smooth surface without slots, knives of any size and thickness and in any number can be assembled and held in place by false work or by suitable gages until they are permanently fastened together in the desired positions by a hardened plastic and preferably by metal connections. A plastic which by its friction on a smooth metal surface will keep the jacket in place can also be used to advantage.

The above characteristics can also be readily used in making a shell lining such as shown in Fig. 11.

Fig. 11 shows a lining for a Jordan shell in which L represents a knife having a hole 61 which is countersunk at each side 60 to receive the end of a spacing pipe such as H.

Preferably each pipe H has a certain number of holes or passages through it at 62 so that a suitable material O can be poured or pressed or otherwise molded so as to conform exactly to the contacting part of each face of a knife L and to fill up the holes 60, 61 and 62 and the inside of each pipe H.

In fact, as shown in Fig. 12 and particularly for a shell lining, knives M, M through which are holes such as 63, can have a material such as 65 molded to their surfaces while it is soft, the knives being held in place by any suitable forms, gages or blocks, and with no metal connections or spacers.

The web at 66 through each hole 63 and the atmospheric pressure between the faces of the molded material and the knives will be sufficient to hold a shell lining assembly together during shipping and installation. After installation, it will hold itself together. However, as shown in Fig. 13, a layer of adhesive 64 can be spread over each face of a knife M and over its hole 63 to assist in preventing the molded material from separating from the surface of a knife. This adhesive construction is more necessary in case of the Jordan plug jacket than in the case of a shell lining.

As shown in Fig. 14, holes such as 61 or 63 need not go entirely through a knife or bar such as N but a hole may be a dead end depression 70 or a groove 71. The moldable material 72 will enter these holes and prevent the bar N from sliding out or loosening.

As shown in Fig. 15, instead of holes, a knife or a bar may have irregularities on its surfaces such as ribs 73. The moldable material 74 will fit around them or in fact there may be an irregularity of hook form as shown at 79.

As shown in Fig. 16, there may be a hole 75 through a knife or bar X and through this hole there may be a holding wire 77 in addition to which there may be irregularities such as a rib 76 or knobs such as 80 all of which cooperate to hold the assembly firmly together.

I claim:

The steps in the process of making a bodily transportable, unitary lining for Jordan engines which consists of holding knives in spaced relation in a predetermined position forming a hollow truncated cone, by means of an inside form, by spacing means, and means to close the ends of the space between each pair of knives to form pockets; of turning the assembly so that the pocket between a pair of knives is horizontal and open at the top; of filling part of that pocket with a moldable plastic; of turning the assembly until there is another such pocket which is horizontal and open at the top; of so filling part of that pocket; and of continuing to so fill such pockets around the circumference.

ARCHER LE ROY BOLTON.